UNITED STATES PATENT OFFICE.

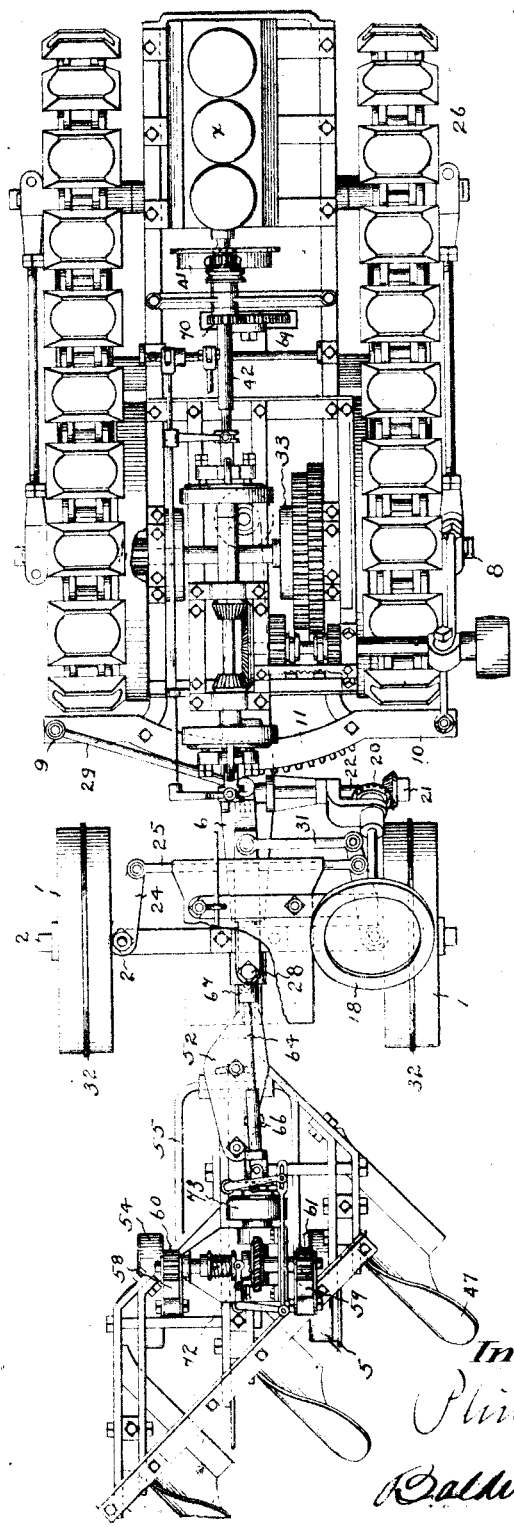

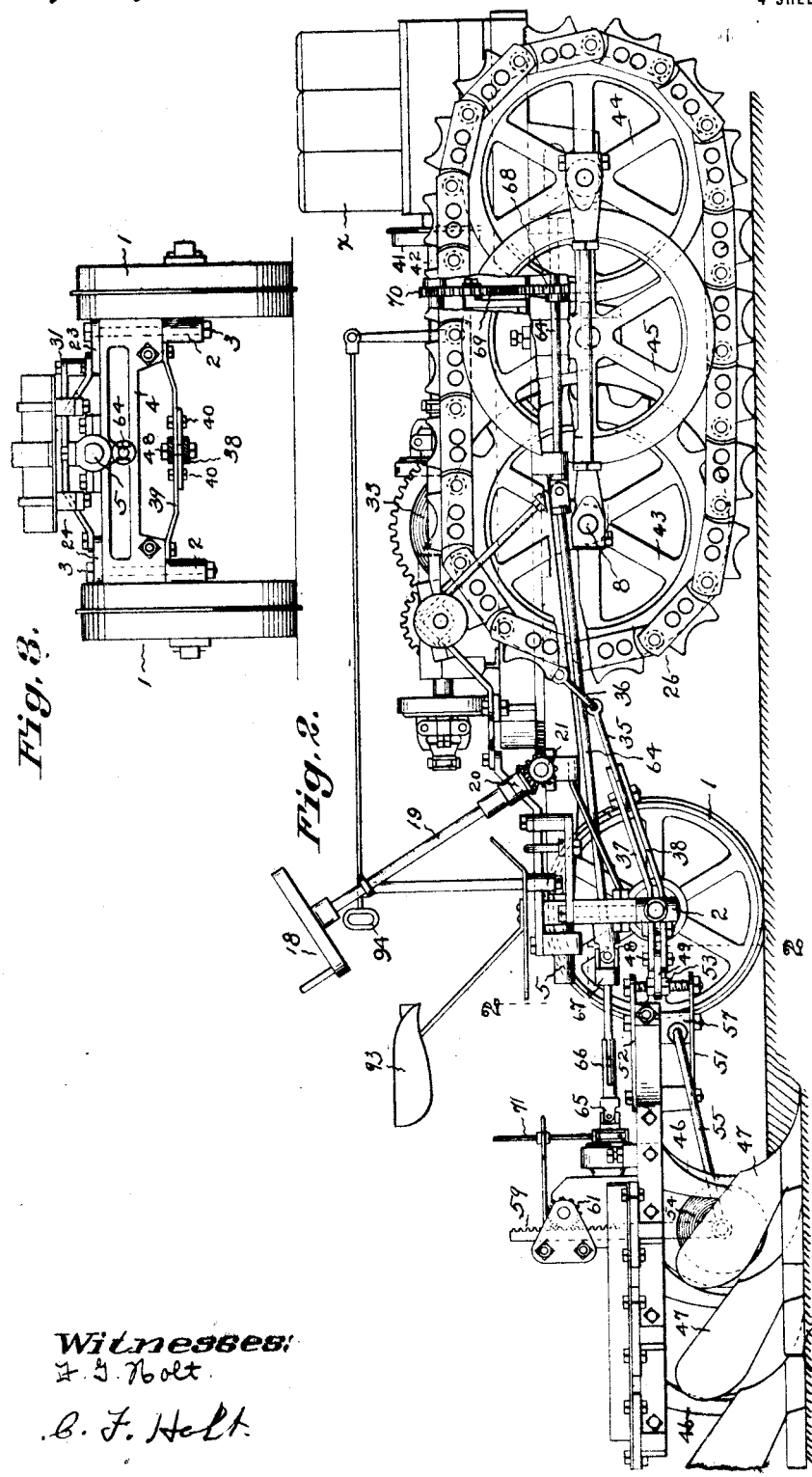

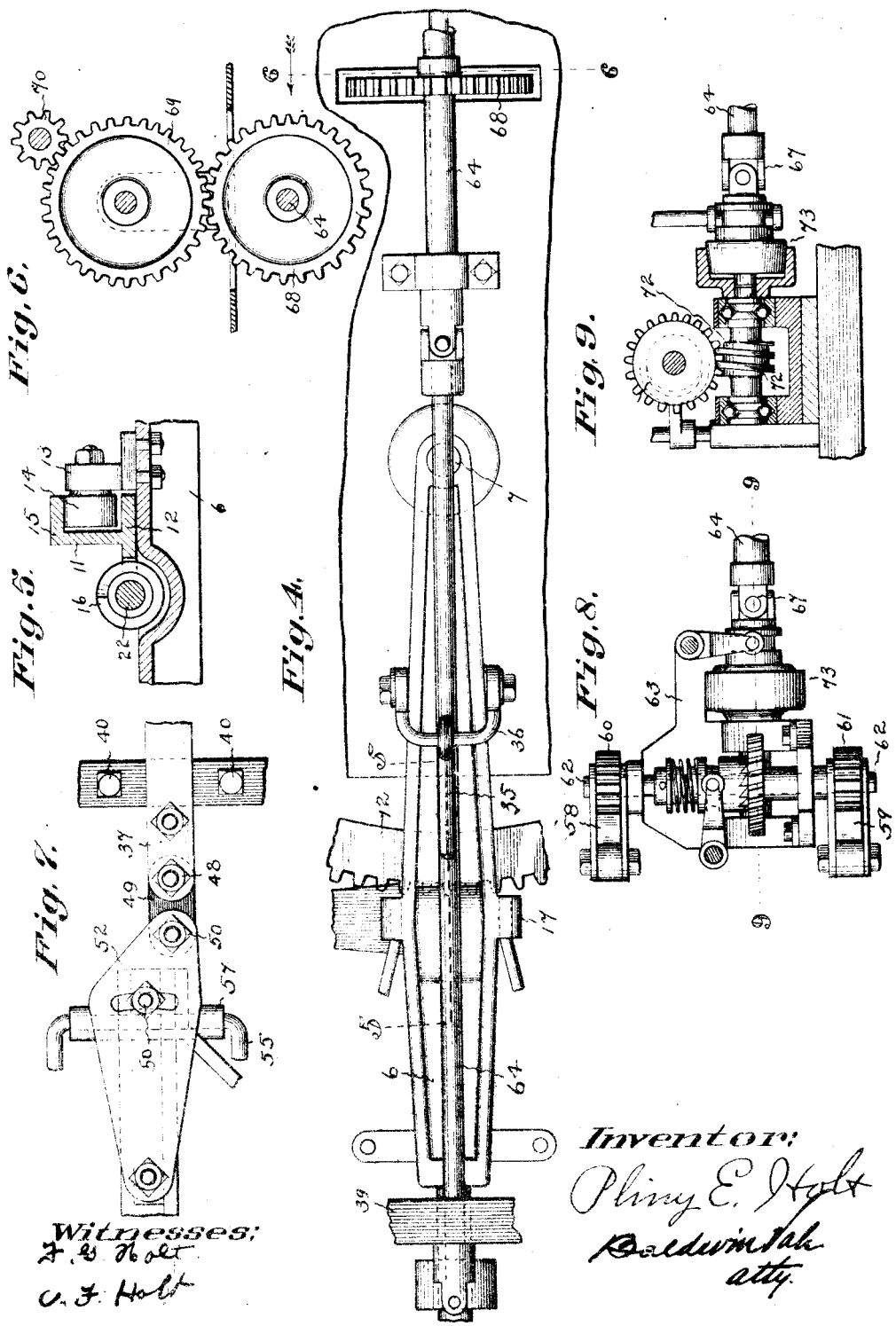

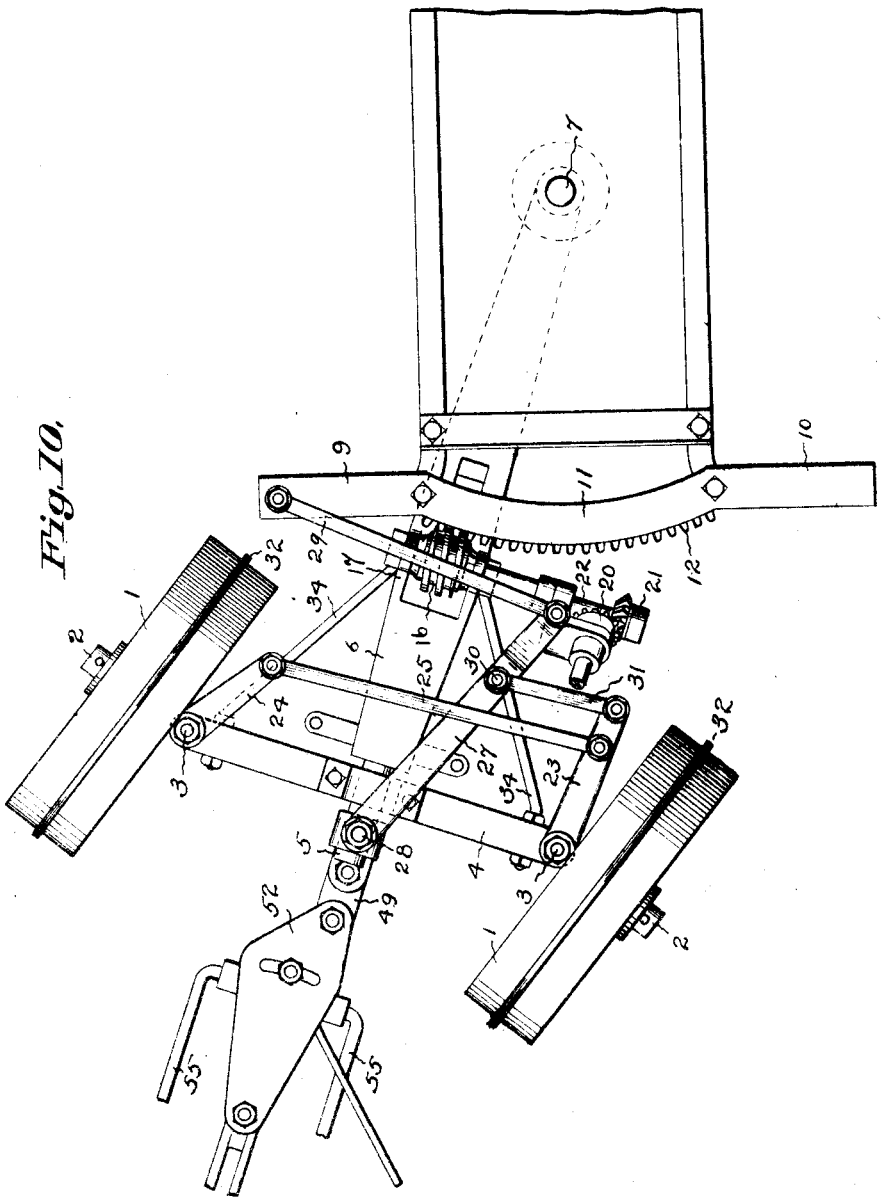

PLINY E. HOLT, OF PIEDMONT, CALIFORNIA.

AUTOTRACTOR.

1,140,823.          Specification of Letters Patent.          Patented May 25, 1915.

Application filed October 16, 1912. Serial No. 726,087.

*To all whom it may concern:*

Be it known that I, PLINY E. HOLT, a citizen of the United States, and a resident of the city of Piedmont, county of Alameda, and State of California, have invented new and useful Improvements in Autotractors, of which the following is a specification.

This invention relates to auto-tractors and more particularly to improvements in the steering mechanism thereof for the control of trailers towed behind the tractor.

The objects sought to be accomplished are to combine a traction mechanism, a steering mechanism and machines of mechanical utility in an interdependent working combination with a centralized control, with a further object of bringing agricultural, freighting and other traction operations under the immediate control of a single operator. Heretofore it has been the usual practice to produce the auto-tractor as an independent machine capable of being hitched to the general types of traction utilities. This results in an aggregation of elements in a general way coöperative but ill-suited to meet the demands of economical operation.

The problem of steering an auto-tractor involves two principles, the pressure of gravity on the pilot wheels to give them traction, and horizontal leverage to give the tractor direction. Theoretically, the pilot wheel or wheels should be the fulcrum point of the lever. The power is represented by the progressive inertia of the tractor; therefore, the fulcrum should be as near—as mechanically practical—to the load or point of greatest resistance. Circumlocution being proverbial in the workings of the laws of evolution, the development of the auto-tractor in the greater percentage of cases shows the pilot wheel in front as a concession to precedents established in the horse drawn vehicle. The auto-tractor being a pushed vehicle or the reverse of a drawn-vehicle, the front pilot wheel appears absurd for many reasons. It is a recognized fact in any drawn load that the burden is reduced by applying the draft with a slight lifting action, for this reason a wagon should be loaded heavy in front. In a wagon the prime mover precedes the pilot wheels that are carrying the major load. The same principles are involved in mechanical traction, it is logical that the pilot wheel should be behind the tractive element, for the very obvious reason that the lifting tendency between the draft bar and the load tends to elevate pilot wheels located in front and to a considerable extent destroy their function. This logic is substantiated in the workings of nature, the steering appurtenances are to the rear of the power in all birds of flight, fish, animals, reptiles, etc. Acting upon this discovery, applicant has embodied it in his invention grouping the tractor element, the steering element and the load element into an interacting working combination whereby the functioning of each element contributes as much as may be to the proper working of the whole.

Broadly stated, this invention consists of a traction element of the "caterpillar" type, having a steering truck pivoted thereto, pilot wheels pivoted on said truck, means for synchronously swinging the steering truck about its pivot and the pilot wheels about their pivots; the steering mechanism being interposed between the traction element and the load element; whereby the load element exerts a downward pressure upon the steering truck and through it a downward pull on the traction element.

In the drawings, Figure 1 is a plan view from above of a tractor constructed in accordance with this invention and combined with a power-lift plow representing the load element. Fig. 2 is a side elevation of the same. Fig. 3 is an end elevation of the steering truck with the plow detached. Fig. 4 is a fragmentary detail in plan from beneath the tumbling shaft, extending from its engagement with the motive mechanism rearward to the power lift mechanism of the plow. Fig. 5 is a fragmentary view partially in cross section, looking at the end of the steering worm mounted upon the steering truck and enmeshed with the gear segment mounted on the tractor main frame. Fig. 6 is an end elevation of the train of gears extending between the motive mechanism and the tumbler shaft of the plow lift. Fig. 7 is a fragmentary detail in plan, showing the mechanism for varying the lead or "gather" of the plow. Fig. 8 is a detail plan looking down upon the power mechanism for raising or lowering the plow. Fig. 9 is a side elevation of the same partially in cross section taken on the line 9—9. Fig. 10 is a diagramic plan from above of the steering mechanism shown in the positions assumed in the maximum lateral swing.

In detail the construction consists of the pilot wheels 1 mounted upon journal stubs on the steering knuckles 2, that are pivoted at 3 on the opposite ends of the axle 4. The axle 4 consists of a trussed structure swiveled on the rounded end 5 of the draw-bar 6 that is pivoted on the pin 7 fixed in the main frame of the tractor, forward of the drive-shaft 8 of the traction element. The purpose of thus locating this pivotal point is to shorten the radius of the traction elements in rounding curves.

The rear end of the tractor main frame is provided with the cross bar having the lateral extensions 9 and 10, and the center portion 11, outwardly curved, its radius being struck from the pivotal center 7 of the steering truck. The rack segment 12 is attached to the cross bar 11. The bracket 13 carrying the roller 14 is fixed on the draw-bar 6. The roller 14 impinges upon the flange 15 of the crossbar 11 and the upper surface of the rack 12 to maintain horizontal alinement between the traction and the steering elements. The gear worm 16 is mounted between the brackets 17 mounted upon the drawbar 6. This worm is enmeshed with the rack segment 12, fixed upon the main frame of the tractor. Rotation is transmitted from the hand wheel 18 through the column 19 and the miter gears 20 and 21 respectively fixed upon the column 19 and the shaft 22 of the gear worm. The function of the worm and sector is to swing the steering truck to the right or left, with respect to the traction element at the will of the operator. The steering knuckle spindles 3 are provided with the steering arms 23 and 24, rigidly fixed thereon. These steering arms are caused to act in unison by the cross-bar 25, the opposite ends of which are pivoted to the steering arms. To cause the proper tracking of the pilot wheels behind the traction belts 26 in following the differential arcs, it is necessary to reverse the angle of travel of these two elements, that is, in making a turn to the right the pilot wheels are swung to the left about their pivots 3 while the traction mechanism is caused to swing to the right about the pivot 7. This is accomplished by the swinging arm 27 pivoted at 28 on the draw-bar 6. The front end is connected to the extension 9 on the main frame by the connecting link 29. The ratio of divergence in the differential arc being determined by the point 30 where the connecting link 31 is pivoted to the swinging arm 27 and the end of the steering arm 23. As the steering truck is swung about its pivot on the traction mechanism, the pilot wheels are swung on their pivots on the steering axle. The proper ratio is maintained throughout the arc. The angle of resistance of the pilot wheels to the line of progress of the traction mechanism causes the latter to swing at an angle determined by the pilot wheels.

The pilot wheels are provided with the upstanding flange 32 to increase the resistance. The traction mechanism is provided with a differential gearing 33 to facilitate turning as is common in this art. The horizontally pivoted steering truck is provided with the stay-rods 34 extending from opposite ends of the truck to the draw-bar to give lateral rigidity to the structure. The draft bar 35 engages the yoke 36 attached to the draw-bar. The rearward extension of the bar comprises two straps 37 and 38, that pass respectively above and below the cross brace 39 on the steering truck. The stop bolts 40 limit the lateral swing of the draft bar. This play is allowed to permit slight lateral deviations of the tractor, without affecting the trailer.

The tractor is driven by the prime mover $x$, having a driving pinion enmeshed with an internal gear 41, for imparting reduced speed to the main transmission shaft 42, whose rotation is transmitted through speed changing gearing reverse gearing and differential gearing to the driving pinions enmeshed with internal gears fixed to the main driving sprockets 43. These sprockets engage the traction belts 26, that encircle traction trucks composed of the driving sprockets journaled to the main frame, idle sprockets 44, bracketed to the main frame and intermediate rollers 45 resiliently attached to the main frame and adapted to carry the major portion of the weight of the tractor as they roll upon the upper side of the ground portion of the traction belt that is drawn under them by the driving sprockets.

Combined with the above described traction mechanism and steering mechanism is a gang plow depending upon the traction mechanism for its forward progress and for its raising and lowering power and upon the steering mechanism for the direction of its progress and for partial support. The plow consists of the main frame having the standards 46 upon which the plow base 47 are mounted. The forward end of the plow frame is attached to the draft bar 35 by the coupling pin 48 engaging the coupling 49. The bolt 50 extending between the plates 51 and 52 engages the coupling 49. The running nuts 53 provide vertical adjustment of the coupling. The forward end of the plow frame is thus supported upon the steering truck. The plow is provided with the rollers 54 mounted upon the radius rods 55 which extend forward and are pivoted in the block 57 fixed upon the front end of the plow frame. The rack bars 58 and 59 are pivoted near these rollers and extend upward and engage the pinions 60 and 61 fixed on the shaft 62 journaled in the base 63 mounted upon the plow frame. The shaft 62 is provided with a worm gear 72 and clutch mechanism 73 geared to the tumbling shaft 64. The tumbling shaft is provided with the universal joint 65 and the slip joint 66 and the universal joint 67, and is mounted in suitable journal boxes on the tractor main frame. The tumbling shaft receives its rotation through the gear 68 splined thereon and enmeshed with the gear 69, enmeshed with the pinion 70 fixed upon the transmission shaft that is geared to the prime mover. Rotation is thus transmitted from the prime mover to the raising and lowering mechanism on the plow, within manual control of the operator through the clutch control lever 71.

The control of the whole mechanism is centralized at or near the spring seat 93 for the operator. From his position he can control the main clutch through the handle 94, the various speed changing levers and throttle mechanisms (not shown) of the prime mover; the steering mechanism through the wheel 18 or the plowing mechanism through the lever 71. Other manual operations are in the nature of fixed adjustments not necessarily under the immediate control of the operator. The gear wheel 68 controlling the tumbling shaft to the plow is splined so that this gear can be thrown out of mesh when rotation of the tumbling shaft is unnecessary. Sprockets and chain may be substituted for the gear train if desired.

A plow has been illustrated and described as the third element in the combination, but applicant does not wish to be confined to this later mechanism in the interpretation of his invention. Such other agricultural implement, as harvesters, binders, reapers, mowing and other machines that might derive their power through the tumbling shaft can be trailed behind as substitutes for the plow or in combination with each other behind the steering mechanism. The traction and steering mechanism will work in combination with wagons single or entrain, the steering wheels acting as the front truck of the first wagon, succeeding wagons being provided with similar steering trucks, if it is desired to form a close coupled train capable of turning in a short radius. In this instance the tumbling shaft can be connected to auxiliary traction mechanisms on the wagons.

By my invention the leverage of the trailer in turning a corner is exerted against the pilot wheel and not against the engine frame as would be the case if the trailer were pivoted directly to the engine frame in the usual manner. As a result my trailer follows an arc practically coincident with the arc traveled by the tractor, instead of a lesser arc, as would be the case if the intermediate pilot or supporting wheel or wheels were omitted.

Having thus described this invention, what is claimed and desired to be secured by Letters Patent is:

1. The combination of a tractor including a main frame, a prime mover, traction elements and interposed gearing between the prime mover and the traction elements, a steering mechanism comprising a drawbar pivoted on the tractor element, a rack segment fixed on the tractor main frame, a gear worm enmeshed with the rack segment and mounted upon the drawbar; means for rotating the gear worm; an axle pivoted upon the drawbar, stub axles pivoted upon said axle, pilot wheels journaled upon the stub axles, steering arms fixed on the stub axles and a connecting rod pivoted to the steering arms, a swinging lever pivoted on the drawbar and linked to the main frame and connected with one of the steering arms; and a draft bar attached to the draw bar and guided by the steering mechanism.

2. The combination of a tractor including a tractor frame, a prime mover, traction mechanisms and transmission gearing interposed between the prime mover and the traction mechanism; a draw bar pivoted on the tractor frame; a rack segment fixed upon the tractor frame, a gear worm enmeshed with the rack segment and mounted upon the draw bar, an axle mounted upon the draw bar, pilot wheels pivoted upon the said axle, means for synchronously swinging the draw bar about its pivot and the pilot wheels about their pivots.

3. A tractor including a main frame, a prime mover, a traction mechanism, suitable gearing interposed between the prime mover and traction mechanism; a draw bar pivoted upon the main frame, an axle pivoted upon the draw bar, stub axles pivoted upon said axle, pilot wheels journaled upon the stub axles; a rack segment mounted upon the main frame, a gear worm rotatably mounted upon the draw bar and meshed with the rack segment, a steering lever pivoted upon the draw bar and linked to the main frame and connected to one of the stub axles.

4. A tractor including a main frame, a prime mover, traction mechanism transmission gearing interposed between the prime mover and the traction mechanism, a draw bar pivoted upon the main frame, an axle on said draw bar, stub axles pivoted upon said axle, pilot wheels journaled upon said stub axles, a connecting rod pivotally connected with said stub axles; and a steering lever pivoted upon said draw bar and linked to said stub axles and the main frame.

5. The combination of a tractor supported upon an endless flexible traction member; a tractor frame, a draw bar pivoted to the tractor frame, a steering truck mounted upon said draw bar, and having a pilot wheel mounted upon a vertical pivot, and means by which the draw bar is shifted from side to side and the pilot wheel is synchronously turned on its vertical pivot.

6. The combination of a tractor frame supported upon an endless flexible traction member, a draw bar pivoted to the tractor frame, a steering truck pivoted on said draw bar, and including a pilot wheel mounted upon a vertical pivot, means for synchronously moving the draw bar about its pivot and the pilot wheel about its pivot.

7. In combination with a tractor, a steering element comprising a draw bar pivoted to the tractor, a steering truck attached to the draw bar, and having a pilot wheel pivoted thereon, a steering means for said pilot wheel and a shifting mechanism interposed between said draw bar and the tractor, and connected to the steering means for said pilot wheel.

8. In a tractor, the combination with a tractor frame carrying an engine and traction wheels, of a rear steering truck pivotally connected with the tractor frame on a vertical axis, and embodying steering wheels pivotally connected with the steering truck on vertical axes located in rear of the pivotal connection between the truck and tractor frame, and means whereby a swinging movement imparted to the steering truck with relation to the tractor frame imparts a synchronous swinging movement to the steering wheels on their individual axes.

9. In a tractor, the combination with a tractor frame carrying an engine and track members driven by the engine, of a steering truck pivotally connected with the tractor frame in proximity to the drive shaft of the tractor, and embodying pilot wheels journaled to swing on vertical axes on said steering truck in rear of the tractor frame, means for swinging the steering truck and tractor frame laterally with relation to each other, and means for simultaneously swinging the pilot wheels on their vertical axes in synchronism with the relative movement of the truck and frame.

PLINY E. HOLT.

Witnesses:
F. G. HOLT,
C. F. HOLT.